United States Patent [19]

Yamanaka et al.

[11] Patent Number: 5,665,669
[45] Date of Patent: Sep. 9, 1997

[54] METALLIC HONEYCOMB BODY FOR SUPPORTING CATALYST AND PRODUCTION METHOD THEREOF

[75] Inventors: Mikio Yamanaka; Masuhiro Fukaya; Nobuhiro Fujita, all of Futtsu; Yasushi Ishikawa, Tokai; Toshikazu Nakagawa, Tokai; Masao Yashiro, Tokai; Hitoshi Ohta, Tokai, all of Japan

[73] Assignee: Nippon Steel Corporation, Tokyo, Japan

[21] Appl. No.: 318,753

[22] PCT Filed: Feb. 10, 1994

[86] PCT No.: PCT/JP94/00205

§ 371 Date: Oct. 12, 1994

§ 102(e) Date: Oct. 12, 1994

[87] PCT Pub. No.: WO94/17911

PCT Pub. Date: Aug. 18, 1994

[30] Foreign Application Priority Data

Feb. 12, 1993 [JP] Japan ............... 5-024517

[51] Int. Cl.⁶ .................. B01J 21/04; C22C 38/22; C22C 38/06
[52] U.S. Cl. .................. 502/527; 502/439; 420/62; 420/63; 420/40; 420/103; 420/117
[58] Field of Search .................. 502/527, 439; 420/62, 63, 40, 103, 117

[56] References Cited

U.S. PATENT DOCUMENTS

| | | |
|---|---|---|
| 4,300,956 | 11/1981 | Rosenberger et al. .......... 148/6.3 |
| 4,465,525 | 8/1984 | Yoshimura et al. .......... 148/37 |
| 4,752,599 | 6/1988 | Nakamura et al. .......... 502/257 |
| 4,959,342 | 9/1990 | Shibata .......... 502/439 |

FOREIGN PATENT DOCUMENTS

| | | | |
|---|---|---|---|
| A-509453 | 10/1992 | European Pat. Off. | C22C 38/34 |
| A-566748 | 10/1993 | European Pat. Off. | B01J 35/04 |
| B2 63-44466 | 9/1988 | Japan . | |
| A 1-218636 | 8/1989 | Japan . | |
| A 2-14747 | 1/1990 | Japan . | |
| A-1112632 | 5/1968 | United Kingdom | C22C 39/18 |

*Primary Examiner*—Asok Pal
*Assistant Examiner*—In Suk Bullock
*Attorney, Agent, or Firm*—Kenyon & Kenyon

[57] ABSTRACT

A metallic honeycomb body for supporting a catalyst comprises a flat plate and a corrugated plate; these plates are formed by a foil of stainless steel in which the steel contains more than 1% of Si and the surface of the steel is covered by a film which is mainly formed by an oxide chrome at a high temperature, and are mutually bonded by diffusion bonding.

The chemical composition of the foil material is comprised of up to 0.2% of C, more than 1 to 5% of Si, 9 to 22% of Cr, up to 0.8% of Al, and as necessary, at least one member selected from the group of Nb, V, Mo W and REM (rare earth member) including Y.

The metallic honeycomb body is formed by which said body is annealed at a vacuum degree of $10^{-2}$ to $10^{-4}$ Torr and in a temperature range of 1200° to 1300° C. for 1 to 30 minutes in a vacuum annealing furnace.

11 Claims, 3 Drawing Sheets

×300

×300

METALLIC HONEYCOMB BODY FOR SUPPORTING CATALYST AND PRODUCTION METHOD THEREOF

TECHNICAL FIELD

This invention relates to a metallic honeycomb body for supporting a catalyst which is used for a catalytic device for purifying the exhaust gas of an internal combustion engine or for a catalytic device in a chemical plant.

BACKGROUND ART

Recently, the number of metallic carriers used for a catalytic device for purifying the exhaust gas from an internal combustion engine, particularly a gasoline engine of a car, have gradually increased. This is because a metallic carrier has a greater porosity than the ceramic carriers that have been used, and also has higher durability in an environment where temperature changes are great. Generally, the metallic carrier is fabricated by the following procedure: forming a flat foil having a thickness of about 50 μm from a heat-resisting stainless steel foil and then forming a corrugated foil by corrugating the flat foil, winding the flat and corrugated foils or stacking the two foils to form a honeycomb body, placing the honeycomb body in an outer jacket and then mutually bonding the honeycomb body and the jacket.

A Fe-Cr-Al alloy foil having an excellent oxidation resistance has been used for the stainless steel foil as described in Japanese Examined Patent Publication (Kokoku) Nos. 58-23138 and 54-15035 and Japanese Unexamined Patent Publication (Kokai) No. 56-96726. The foil forms an aluminum oxide film on the surface thereof at a high temperature, and maintains an extremely high oxidation resistance. Various bonding methods have been employed, such as the brazing described in Japanese Unexamined Patent Publication (Kokai) No. 61-199574, the resistance welding described in Japanese Unexamined Patent Publication (Kokai) No. 64-40180, the laser and electron beam welding described in Japanese Unexamined Patent Publication (Kokai) No. 54-13462, and various other methods.

The Fe-Cr-Al alloy foil used for the honeycomb body, such as a 20Cr-5Al steel foil, has an excellent oxidation resistance, but its workability is inferior because of high Al content. Accordingly, productivity is extremely low and the production cost is high.

The environment of the practical use of the honeycomb body is about 800° C. at the highest in most cases, and the oxidation resistance of this foil is, in many cases, excessive.

Brazing is most widely used as the bonding method. However, the brazing material used in this method is expensive. Furthermore, the bonding process includes the application of a binder, attachment of the brazing material and vacuum heat-treatment, and is extremely complicated. Resistance welding is a production method having low productivity and is not suitable for mass-production. Laser beam welding involves the problem that the welding apparatus is extremely expensive.

A diffusion bonding is known as a relatively economical bonding method and is described in U.S. Pat. No. 4,300,956 and Japanese Unexamined Patent Publication (Kokai) No. 1-270947. However, in order to secure the oxidation resistance necessary for a catalytic substrate by the foil material, the following problem occurs. Because the material used is an Fe-Cr-Al alloy, it reacts with trace oxygen sources (CO, $H_2O$) inside a furnace during vacuum heat-treatment for diffusion bonding, and an extremely thin aluminum oxide film is formed on the foil surface. Accordingly, even when the material is heated to a high temperature above 1,200° C., this film impedes diffusion bonding, and bonding unavoidably becomes local and unstable.

To solve such a problem, technologies requiring a long time for diffusion bonding are known. For example, Examples of Japanese Unexamined Patent Publication (Kokai) No. 2-14747 describe heat-treatment at 1,100° C. for 2 hours and Japanese Unexamined Patent Publication (Kokai) No. 1-266978 describes, in its Examples, heat-treatment at 1,100° C. for 1.5 hours.

Ordinary stainless steels such as SUS430 and SUS410, described as foil materials in Japanese Unexamined Patent Publication (Kokai) No. 1-270947, lack the oxidation resistance necessary as a substrate of a catalyst for an automobile exhaust gas.

The present invention is completed so as to solve the problems described above, and is directed to provide an economical metallic honeycomb body (and a metallic carrier) for a catalyst by using a stainless steel containing a high Si-Cr and a low Al content and a relatively simple bonding method.

It is another object of the present invention to provide a metal honeycomb body for a catalyst having a high oxidation resistance.

DISCLOSURE OF THE INVENTION

To accomplish the objects described above, the inventor of the present invention has examined those materials which have a high oxidation resistance and high bondability as a metallic honeycomb foil material and has discovered that when the Al content is limited to a range in which the aluminum oxide film is not formed, that is, a range not greater than 0.8% (hereinafter, the term "%" represents "wt %") by adding 1 to 3.5% of Si to the ferritic stainless steel, diffusion bondability is not deteriorated in vacuum. A chromium oxide film is formed on the surface of the foil material which is extremely compact and oxidation resistance necessary for an automobile exhaust metallic catalyst carrier can be maintained in a wet oxidizing atmosphere, such as engine exhaust gas, up to 800° C.

In other words, when the foil material consisting of the Si-containing stainless steel is heat-treated in an ordinary vacuum (or in an inert atmosphere) under a predetermined condition, sub-scales are formed just below the surface of the foil material, and the resulting sub-scales inhibit diffusion of Al to the surface layer portion of the foil material. Therefore, if the Al content is not greater than 0.8% (up to the impurity level), the aluminum oxide film is not formed.

Accordingly, when the metal honeycomb body is heat-treated in the atmosphere described above, the constituent atoms inside the flat foil and the corrugated foil diffuse mutually as they remain in the solid phase, and the bonding portions have the same metallic structure as in a base metal (diffusion bonding).

In prior art ferritic stainless steel materials containing up to 1% Si, iron oxides formed which deteriorated the protective capacity of a chromium oxide film. In the present invention, wherein the ferritic stainless steel material contains more than 1% Si, a compact chromium oxide film is formed which contains reduced iron oxides compared to the prior art materials containing less than 1% Si. The chromium oxide film of the present invention formed from a ferritic stainless steel containing more than 1% Si does not have an oxidation resistance equivalent to aluminum oxide.

Nevertheless, the chromium oxide film, in accordance with the present invention, exhibits sufficient oxidation resistance for use in an engine exhaust metallic catalyst carrier in a wet oxidizing atmosphere, such as an engine exhaust, at temperatures up to 800° C.

Because the material of the present invention has a small Al content and excellent diffusion bondability, diffusion bonding can be made by heating to between 1,200° C. and 1,250° C. for a retention time of 15 to 30 minutes, or for a shorter retention time at a temperature of 1,250° to 1,300° C. Namely, diffusion bonding can be performed in from 1 to 15 minutes.

As described above, the present invention facilitates diffusion bonding by using a stainless steel foil containing at least 1% of Si as the foil material of the honeycomb body of the metallic carrier, and at the same time secures a necessary oxidation resistance. Because the Al content is limited to not greater than 0.8%, the aluminum oxide film does not become a problem and a relatively simple diffusion bonding process is employed. Diffusion bonding can be smoothly carried out within a shorter time.

BEST MODE FOR CARRYING OUT THE INVENTION

Figure 1:
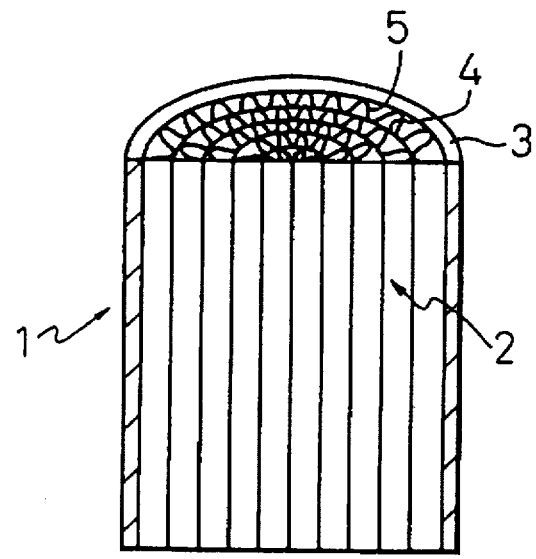
FIG. 1 is a sectional view showing, schematically, a metallic carrier.

First, chemical components of a Cr system stainless steel foil that constitutes a honeycomb body for supporting a catalyst according to the present invention will be explained.

Silicon (Si) prevents the formation of an aluminum oxide film on the surface of a foil, activates diffusion of constituent atoms, makes the protective film of chromium oxide formed in a high temperature oxidizing atmosphere more compact and improves the oxidation resistance. Therefore, Si is added in an amount within the range of 1 to 3.5%. If the amount is less than 1%, the effect of the addition of Si is not sufficient and if it exceeds 3.5%, the material quality deteriorates and the productivity drops remarkably.

Manganese (Mn) is an element which is unavoidably present during steel production, but there occurs no problem, in particular, if the amount is that which is normally contained in ordinary steels, that is, not greater than 1%.

When 0.8% or more of aluminum (Al) is added to the Cr system stainless steel, it forms a protective film of aluminum oxide at a high temperature and improves oxidation resistance. However, aluminum is excluded in the present invention because it impedes diffusion bonding. However, Al can be added within the range in which the aluminum oxide coating is not formed, that is, not greater than 0.8%, in order to bring the transformation point of the foil material to a higher temperature than the temperature of use.

Carbon (C) lowers the melting point of the foil material and makes diffusion bonding easier. Therefore, at least 0.005% is added, and the upper limit is set to 0.2% because the material deteriorates when C is added in excess.

Chromium (Cr) is a fundamental element for maintaining oxidation resistance of the stainless steel. If the amount is less than 9%, oxidation resistance is insufficient, and if it exceeds 22%, the material becomes harder and productivity drops. Accordingly, the amount of Cr is stipulated to be within the range of 9 to 22%.

Rare earth elements, inclusive of Y, improve the oxidation resistance of the foil material, and may be added to the foil material if the catalyst carrier will be subject to large temperature changes in short time intervals or where loads such as thermal fatigue are great. However, if the sum of the amount of one or more of these elements is less than 0.01%, the effect of the addition does not exist, and if it exceeds 0.2%, scratches occur during production of the material. For these reasons, the amount is limited to from 0.01 to 0.2%.

Nb, V, Mo and W improve the high temperature strength of the foil material within the following ranges:

Nb: 0.05 to 1.0%, V: 0.03 to 0.5%

Mo: 0.3 to 3%, W: 0.5 to 3%

If the amount of each element is less than its lower limit, the effect of the addition is insignificant, and if it exceeds the upper limit, the material becomes harder and productivity drops. Among these elements, Nb and Mo improve corrosion resistance of the foil material. Accordingly, these elements are preferably added in the cases where dew point corrosion due to sulfuric acid becomes a problem in a catalyst for a Diesel engine.

Table 1 illustrates some examples of the foil compositions that can be used for the honeycomb body according to the present invention. Among the chemical compositions of the foil material used in the present invention, no stipulation is made, in particular, to P and S, and they render no problem so long as their amounts remain at the level found in ordinary stainless steel.

TABLE 1

| Steel No. | C | Si | Mn | Cr | Al | Y | Ce,La | Nb | V | Mo | W (wt %) |
|---|---|---|---|---|---|---|---|---|---|---|---|
| A | 0.06 | 3.3 | 0.3 | 9.2 | 0.78 | — | — | — | — | — | — |
| B | 0.07 | 1.9 | 0.4 | 12.4 | 0.15 | — | — | — | — | — | — |
| C | 0.01 | 1.1 | 0.3 | 21.7 | 0.01 | — | — | — | — | — | — |
| D | 0.08 | 1.5 | 0.3 | 16.3 | 0.16 | 0.06 | — | — | — | — | — |
| E | 0.01 | 1.3 | 0.2 | 19.0 | 0.11 | — | 0.08 | — | — | — | — |
| F | 0.07 | 2.0 | 0.3 | 11.8 | 0.15 | 0.03 | 0.04 | — | — | — | — |

TABLE 1-continued (wt %)

| Steel No. | C | Si | Mn | Cr | Al | Y | Ce.La | Nb | V | Mo | W |
|---|---|---|---|---|---|---|---|---|---|---|---|
| G | 0.01 | 1.7 | 0.3 | 14.2 | 0.05 | — | — | 0.32 | — | — | — |
| H | 0.01 | 2.5 | 0.4 | 10.9 | 0.22 | — | — | 0.20 | 0.08 | — | — |
| I | 0.07 | 1.8 | 0.3 | 12.1 | 0.17 | — | — | — | — | 1.9 | — |
| J | 0.07 | 1.7 | 0.3 | 13.4 | 0.19 | — | — | — | — | — | 2.0 |
| K | 0.008 | 1.4 | 0.5 | 18.3 | 0.04 | — | — | 0.15 | — | 1.0 | — |
| L | 0.01 | 2.2 | 0.3 | 11.4 | 0.02 | 0.05 | — | 0.28 | — | — | — |
| M | 0.007 | 2.0 | 0.4 | 12.5 | 0.01 | — | 0.07 | 0.31 | — | — | — |
| N | 0.01 | 1.6 | 0.4 | 15.7 | 0.05 | 0.02 | 0.04 | 0.16 | — | 1.3 | — |
| O | 0.06 | 1.7 | 0.9 | 13.4 | 0.12 | — | — | — | — | — | — |
| P | 0.01 | 1.9 | 0.7 | 12.9 | 0.01 | — | — | 0.41 | — | — | — |
| Q | 0.02 | 1.6 | 0.5 | 13.0 | 0.008 | — | — | — | — | 1.1 | — |
| R | 0.12 | 1.2 | 0.7 | 13.2 | 0.007 | — | — | — | — | 0.9 | 1.0 |
| S | 0.009 | 1.1 | 0.3 | 19.0 | 0.011 | — | — | 0.22 | — | 2.0 | — |
| T | 0.01 | 2.1 | 0.3 | 16.3 | 0.05 | — | — | 0.31 | 0.05 | — | — |
| U | 0.01 | 1.6 | 0.3 | 18.3 | 0.06 | 0.07 | — | 0.15 | — | — | — |
| V | 0.11 | 1.3 | 0.8 | 14.7 | 0.11 | — | 0.05 | — | — | — | — |

Next, a production method for a honeycomb body according to the present invention will be explained.

The honeycomb body according to the present invention, as shown in FIG. 1, is produced by winding integrally under a pressure a flat foil 4 having the chemical composition described above and a thickness of about 50 μm with a corrugated foil 5 obtained by corrugating or by superimposing by a plurality of layers each comprising the flat foil and the corrugated foil. Bonding between the corrugated foil and the flat foil is effected by causing mutual diffusion of constituent atoms in the vicinity of their contact surfaces, with the foils remaining in the solid phase.

In other words, the honeycomb body described above is inserted into a vacuum heating furnace (or a heating furnace containing an inert atmosphere), is heated from room temperature to a temperature in the range of 1,200° to 1,300° C., at a rate of about 20° C./minute. The heated honeycomb body is retained at this temperature for 1 to 30 minutes. When the heating temperature is in the low range of 1,200° to 1,250° C., the honeycomb body must be retained at this temperature for 15 to 30 minutes. When the heating temperature is as high as 1,250° to 1,300° C., the honeycomb body can be bonded within 1 to 15 minutes.

Due to the heat treatment described above, diffusion bonding is carried out on the contact surfaces between the flat foil and the corrugated foil, and the base materials at the contact surfaces turn to an integral metallic structure and are bonded firmly.

After the contact surface of the foils is thus diffusion-bonded, the honeycomb body is cooled in the furnace to the room temperature or is subjected to acceleration cooling by an inert gas.

The metallic carrier can be produced in the following way by using the honeycomb body according to the present invention. First, the honeycomb body is produced by winding or stacking the flat foil and the corrugated foil, and then the honeycomb body is pushed into an outer cylinder by the application of pressure. Alternatively, the honeycomb body may be assembled with the outer cylinder, either as it is, or after a coating agent prepared by blending a powdery brazing agent into a liquid adhesive is applied to a predetermined portion of the outer surface of the honeycomb body. Then the diameter of the outer cylinder is reduced by a contacting machine. In this way, the contact surface inside the honeycomb body and adhesion between the honeycomb body and the outer cylinder are improved. After drying, heat treatment is carried out in the vacuum heating furnace described above. As a result, the honeycomb body undergoes solid phase diffusion bonding, and the honeycomb body and the outer jacket are subjected to either diffusion bonding or are brazed if brazing material is applied between the honeycomb body and the outer cylinder.

The degree of vacuum in the heating furnace is preferably about $1\times10^{-2}$ to $1\times10^{-4}$ Torr, and an inert atmosphere of hydrogen, argon, etc., can be utilized in place of the vacuum atmosphere.

Figure 3:
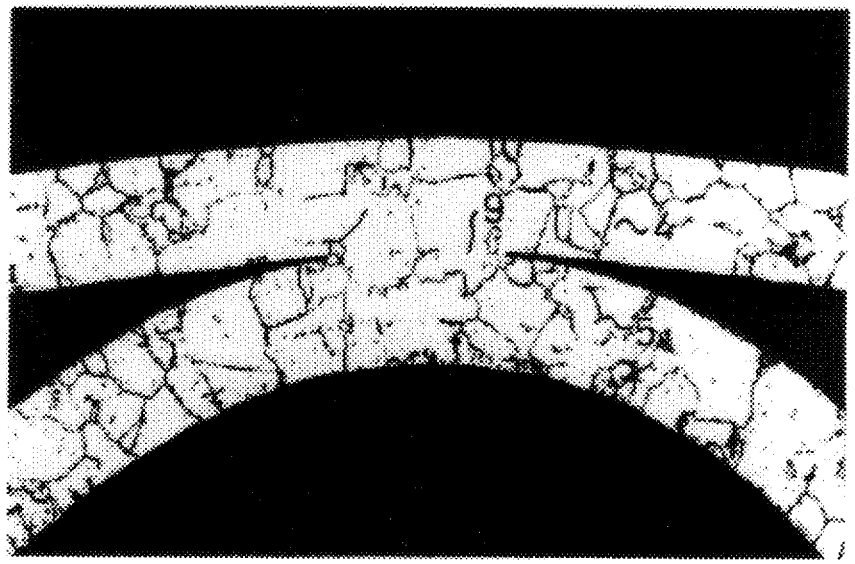
FIG. 3 is a photograph of a metallic texture showing a joint portion of a metallic carrier produced from a flat foil and a corrugated foil as the components of the present invention.
Figure 4:
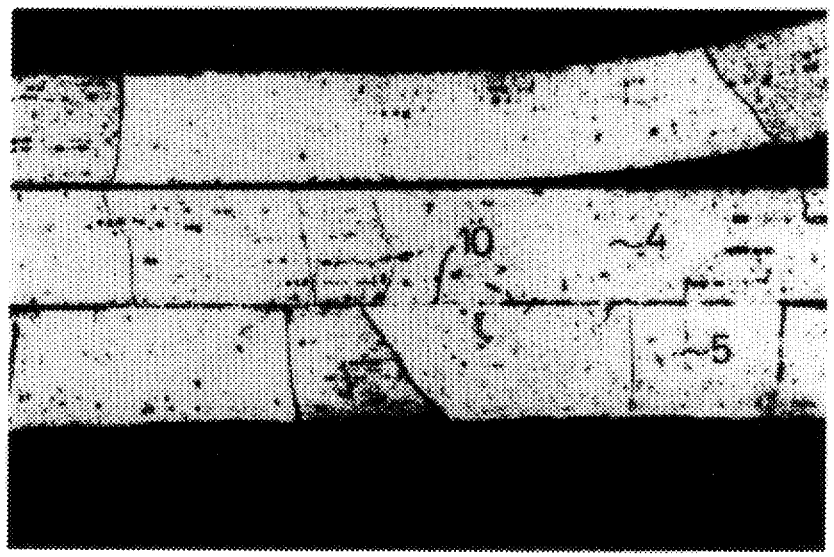
FIG. 4 is a photograph of a metallic structure showing a joint portion of a metallic carrier produced from a flat foil and a corrugated foil according to the related art.

The honeycomb body 2 shown in FIG. 1 is produced using the stainless steel foil of the steel B in Table 1, is pushed into the outer jacket 3 and is vacuum heat-treated for diffusion bonding in a vacuum of $1\times10^{-4}$ Torr, at a heat-treating temperature of 1,210° C. and for a retention time of 28 minutes. FIG. 3 shows a metallographic photograph of the resulting bond portion. A honeycomb body 2 produced by using an Fe-20Cr-5Al stainless steel foil as one of the conventional materials is pushed into the outer cylinder and is then vacuum heat-treated in the same way as in the present invention. FIG. 4 shows a metallographic photograph of the resulting bond portion produced by diffusion bonding.

As can be seen clearly from FIG. 3, at the bond portion inside the honeycomb body produced from the material of the present invention, the crystal structure grows beyond the boundary 9 between the flat foil 4 and the corrugated foil 5, whereas at the bond portion inside the honeycomb body produced from the conventional material, the crystal structure does not grow beyond the boundary 10 between the flat foil 4 and the corrugated foil 5 as can be clearly seen from FIG. 4. Moreover, voids as one of the defects occur along the boundary, and bonding is extremely unstable.

As described above, the present invention allows diffusion bonding with a relatively simpler process and within a shorter time by using the Fe-Cr-Si stainless steel foil and has a far greater productivity than a process using a Fe-Cr-Al alloy stainless steel foil. Accordingly, the present invention can stably provide an economical metallic carrier.

EXAMPLES

Example 1

Figure 2:
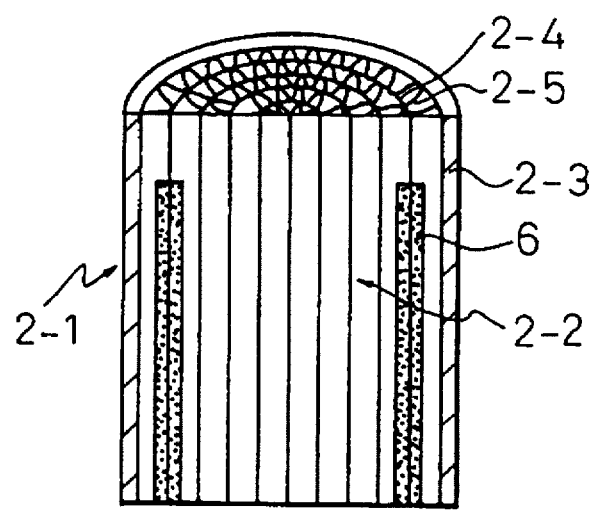
FIG. 2 is a sectional view showing, schematically, a metallic carrier when a stopping agent is applied to a honeycomb body.

A 50 μm-thick flat foil having the chemical composition of the steel B of Table 1 was produced, and a part of the flat foil was subjected to corrugation machining to obtain a corrugated foil. A honeycomb body having an outer diameter of 97 mm and a length of 100 mm was produced by superposing and winding the flat foil and the corrugated foil. As an outer cylinder, a cylinder having an outer diameter of 100 mm and a length of 100 mm was produced from a 19% ferritic stainless steel sheet having a thickness of 1.5 mm. The honeycomb body described above was pushed into this jacket. It was then heat-treated at a vacuum of $1\times10^{-2}$ Torr and 1,210° C. for 28 minutes so as to bond the outer jacket and the outermost periphery of the honeycomb body and the corrugated foil and the flat foil inside the honeycomb body with one another by diffusion bonding. In this case, if the corrugated foil and the flat foil were bonded throughout the entire range inside the honeycomb body, thermal fatigue destruction would be likely to occur during use in the engine. Therefore, a diffusion bonding preventing agent containing titania as its principal component was applied to a portion 6 of the honeycomb body 2—2 indicated schematically by the dotted portion in the sectional view of FIG. 2, in order to prevent the occurrence of diffusion bonding at this portion.

As a Comparative Example, a honeycomb body 2 was produced in the same way as described above by using a Fe-20Cr-5Al foil having a thickness of 50 μm, and the resulting honeycomb body 2 was pushed into the outer jacket 3 to produce the metallic carrier shown in FIG. 1. The support was heat-treated at 1,200° C. for 30 minutes in a vacuum of $1\times10^2$ Torr.

These two kinds of metallic carriers 1, 2-1 were fitted to intermediate portions of an exhaust pipe of a 4-cylinder engine having a capacity of 2,000 cc. While the engine was operated at 5,000 rpm under full load, a cooling/heating test of heating to 800° C. for 10 min then stopping the engine for 20 min, then cooling was repeated for 900 cycles. As a result, no abnormality could be observed in the metallic carrier using the foil of the steel. B of Table 1. The metallic carrier of Comparative Example using the Fe-20Cr-5Al foil resulted in about ⅔ of the central portion of the honeycomb body to move towards the outlet side of the exhaust gas after 600 cycles of the above cycles. As a result of the investigation, the apex of the corrugated foil 5 and the flat foil 4 were found to be reliably diffusion-bonded in the honeycomb body 2 using steel B and the bond portion expanded flat. In the honeycomb body using Fe-20Cr-5Al steel, however, bonding was effected nonuniformly, and even at the bond portion, only dot-like bonding was observed. In other words, this result indicated that in the Fe-20Cr-5Al foil, a film of aluminum oxide is formed during vacuum heat-treatment and diffusion bonding was not effected sufficiently.

Example 2

A 50 μm-thick foil having the chemical composition of the steel Q in Table 1 was produced, and a honeycomb body 2 having an outer diameter of 102 mm and a length of 115 mm was produced by superposing and winding a flat foil 4 and a corrugated foil 5 as shown in FIG. 1. After the honeycomb body 2 was pushed into an outer jacket of 19% Cr steel having a thickness of 1.5 mm, the cylinder was heat-treated at 1,250° C. for 15 minutes in a vacuum of $1\times10^{-4}$ Torr so as to mutually bond the outer jacket 3 and the outermost periphery of the honeycomb body 2, and the flat foil 4 and the corrugated foil 5 inside the honeycomb body 2 by diffusion bonding.

The bonding structure of the metal support 1 was bonded throughout the entire region shown in FIG. 1. As a Comparative Example, a metal support having the same full region bonding was produced by using a Fe-15Cr-4Al foil material having a thickness of 50 μm, and was heat-treated at a temperature of 1,250° C. for 15 minutes in a vacuum of $1\times10^{-4}$ Torr.

These two kinds of metallic carrier 1 were tested by the cooling/heating test by the engine bench in the same way as in Example 1. As a result, though no abnormality could be observed, in particular, in the metallic carrier in accordance with the present invention, the foil of the surface of the honeycomb body 2 of the comparative example at the inlet side of the exhaust gas had partially disappeared after 300 cycles. Accordingly, the experiment was stopped for the comparative example. As a result of investigation, it was found out that diffusion bonding was not sufficiently effected in the honeycomb body 2 of the latter metallic carrier in the same way as in the case of the Fe-20Cr-5Al foil of Example 1.

Example 3

Foils having a thickness of 50 μm and consisting of the chemical compositions of A to V shown in Table 1 were produced, respectively, and honeycomb bodies having an outer diameter of 97 mm and a length of 30 mm were produced by superposing and winding the flat foil and the corrugated foil. Each honeycomb body was pushed into an outer cylinder of 19% Cr steel having a thickness of 1.5 mm, an outer diameter of 100 mm and a length of 30 mm to produce the metallic carrier 1 shown in Table 1. As a Comparative Example, a metallic carrier was similarly produced by using a Fe-20Cr-5Al foil material and inserting the honeycomb body into a outer jacket. Each of the metallic carrier so produced was heat-treated at 1,210° C. for 28 minutes, at 1,250° C. for 15 minutes and at 1,300° C. for 1 minute, in vacuum of $1\times10^{-4}$ Torr in all cases.

Figure 5:
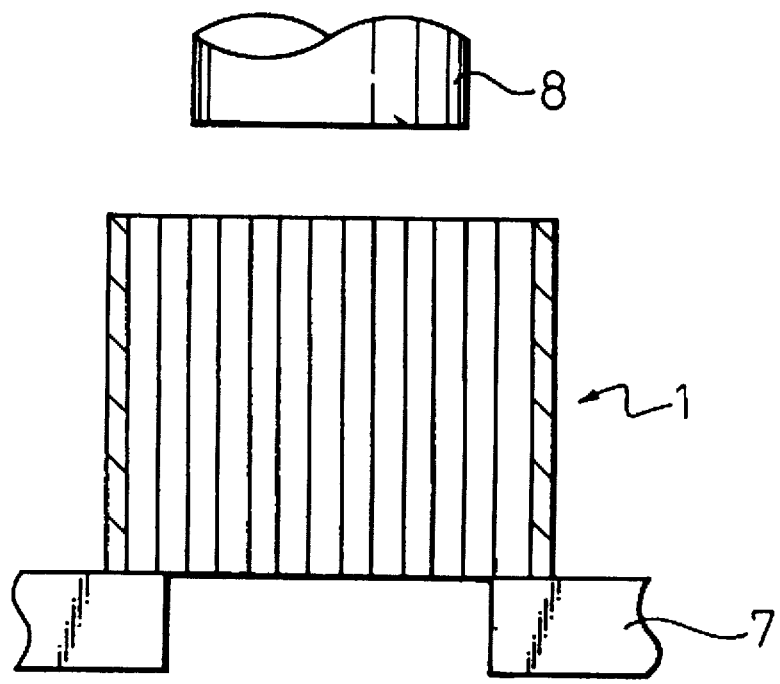
FIG. 5 is a sectional view showing a punching test method of a metallic carrier.

The bonding state of each of these metallic carriers 1 was evaluated by the punching test. The load at the time of deviation of the honeycomb body 2 corresponded to the bonding state inside the honeycomb body 2, and the result was tabulated in Table 2. The punching test was carried out by placing the metallic carrier 1 on the receiving table 7 and punching the carrier 1 from above by a punch 8 as shown in FIG. 5. The inner diameter of the receiving table 7 was 90 mm and the outer diameter of the punch 8 was 87.5 mm.

As a result of the punching test, the metallic carriers according to the present invention could provide a punching load of at least 1,400 kg in any heat-treating conditions, but the metallic carriers of Comparative Examples could provide only punching loads of 150 to 200 kg, and the diffusion bonding was found insufficient.

TABLE 2

| | | heating temp. × heating time | | |
|---|---|---|---|---|
| | steel | 1210° C. × 28 min | 1250° C. × 15 min | 1300° C. × 1 min |
| | | punching loads (kg) | | |
| metallic carrier of this invention | A | 1450 | 1500 | 1600 |
| | B | 2350 | 2300 | 2500 |
| | C | 2500 | 2550 | 2600 |
| | D | 2400 | 2400 | 2450 |
| | E | 2550 | 2600 | 2600 |
| | F | 2300 | 2350 | 2400 |
| | G | 2500 | 2500 | 2500 |
| | H | 1800 | 1900 | 1900 |
| | I | 2100 | 2200 | 2200 |
| | J | 2000 | 2100 | 2050 |

TABLE 2-continued

|  | steel | heating temp. × heating time | | |
|---|---|---|---|---|
|  |  | 1210° C. × 28 min | 1250° C. × 15 min | 1300° C. × 1 min |
|  |  | punching loads (kg) | | |
|  | K | 2600 | 2600 | 2550 |
|  | L | 2550 | 2550 | 2550 |
|  | M | 2600 | 2600 | 2550 |
|  | N | 2500 | 2450 | 2600 |
|  | O | 2400 | 2450 | 2500 |
|  | P | 2450 | 2500 | 2450 |
|  | Q | 2500 | 2600 | 2500 |
|  | R | 2500 | 2600 | 2600 |
|  | S | 2600 | 2600 | 2600 |
|  | T | 2550 | 2600 | 2600 |
|  | U | 2500 | 2550 | 2550 |
|  | V | 2300 | 2350 | 2350 |
| metallic carrier of Comparative Example | 20Cr—5Al | 150 | 200 | 200 |

As shown by the Examples given above, the present invention can provide a metallic carrier for a catalyst at a low cost by using a relatively economical foil material and a simple bonding method, can expand the range of application of the kinds of vehicles, and greatly contributes to pollution counter-measure technologies.

We claim:

1. A metallic honeycomb body for supporting a catalyst characterized in that flat foils consisting essentially of a ferritic stainless steel containing 1.1 to 3.5 wt % of Si and not greater than 0.8 wt % of Al and corrugated foils formed by corrugating said flat foils are alternately stacked or the flat foil and corrugated foil are integrally wound, and bond portions between said flat foil and said corrugated foil stacked or wound with each other are bonded by mutual diffusion of constituent atoms of each of said foils.

2. A metallic honeycomb body according to claim 1, wherein a chemical composition of each of said flat foil and said corrugated foil constituting said metallic honeycomb body comprises 0.005 to 0.2% of C, 1.1 to 3.5% of Si, 9 to 22% of Cr, not greater than 0.8% of Al and the balance of Fe and unavoidable impurities, in terms of a weight ratio.

3. A method of producing a metallic honeycomb body for supporting a catalyst, comprising:

alternately stacking flat foils consisting of a ferritic stainless steel containing 1.1 to 3.5 wt % of Si and not greater than 0.8 wt % of Al and corrugated foils produced by corrugating said flat foils or integrally winding the flat foil and the corrugated foil to form a metal honeycomb body; and applying heat-treatment to said metallic honeycomb body by loading said metallic honeycomb body into a vacuum heat-treating furnace, and keeping it in a vacuum of $10^{-2}$ to $10^{-4}$ Torr and at a temperature of 1,200° to 1,300° C. for 1 to 30 minutes inside said heat-treating furnace.

4. A production method according to claim 3, wherein a chemical composition of said flat foil and said corrugated foil constituting said metallic honeycomb body comprises

| C: | 0.005 to 0.2%, | Si: | 1.1 to 3.5%, |
|---|---|---|---|
| Cr: | 9 to 22%, | Al | up to 0.8%, | and the balance of Fe and unavoidable impurities, in terms of a weight ratio.

5. A production method according to claim 3, wherein the temperature and the retention time inside said vacuum heat-treating furnace are 1,200° to 1,250° C. and 15 to 30 minutes, respectively.

6. A production method according to claim 3, wherein the temperature and the retention time inside said vacuum heat-treating furnace are 1,250° to 1,300° C. and 1 to 15 minutes, respectively.

7. A production method according to claim 3, wherein said vacuum heat-treating furnace is a heating furnace containing an inert gas atmosphere.

8. A metallic honeycomb body according to claim 2, wherein the chemical composition of each of said flat foil and said corrugated foil constituting said metallic honeycomb body further contains, in terms of a weight ratio, 0.01 to 0.2% in total of at least one member selected from a group consisting of rare earth metals inclusive of Y.

9. A metallic honeycomb body according to claim 2, wherein the chemical composition of each of said flat foil and said corrugated foil constituting said metallic honeycomb body further contains, in terms of a weight ratio, at least one member selected from a group consisting of 0.05 to 1.0% of Nb, 0.03 to 0.5% of V, 0.3 to 3% of Mo and 0.5 to 3% of W.

10. A production method according to claim 4, wherein the chemical composition of each of said flat foil and said corrugated foil constituting said metallic honeycomb body further contains, in terms of a weight ratio, 0.01 to 0.2% in total of at least one member selected from a group consisting of rare earth metals inclusive of Y.

11. A production method according to claim 4, wherein the chemical composition of each of said flat foil and said corrugated foil constituting said metallic honeycomb body further contains, in terms of a weight ratio, at least one member selected from a group consisting of 0.05 to 1.0% of Nb, 0.03 to 0.5 of V, 0.3 to 3% of Mo, and 0.5 to 3% of W.

* * * * *